United States Patent [19]

Herring

[11] 4,217,859
[45] Aug. 19, 1980

[54] SLOTTED FLOOR SECTION WITH BUILT-IN MEANS ADAPTED FOR HEATING LITTER IN FARROWING HOUSE

[76] Inventor: William T. Herring, P.O. Box 181, Newton Grove, N.C. 28366

[21] Appl. No.: 49,899

[22] Filed: Jun. 19, 1979

[51] Int. Cl.³ .............................................. A01K 1/02
[52] U.S. Cl. ........................................ 119/20; 119/28
[58] Field of Search ......................... 119/28, 20, 16; 249/118

[56] References Cited

U.S. PATENT DOCUMENTS

| | | | |
|---|---|---|---|
| 3,181,503 | 5/1965 | Tripp | 119/20 |
| 3,469,816 | 9/1969 | Blough et al. | 249/118 |
| 3,677,229 | 7/1972 | Blough et al. | 119/16 |
| 3,809,014 | 5/1974 | Jones et al. | 119/28 |
| 3,815,550 | 6/1974 | Becker | 119/28 |
| 3,826,230 | 7/1974 | Jones et al. | 119/28 |
| 3,905,334 | 9/1975 | Stevenson | 119/20 |
| 4,018,271 | 4/1977 | Jones et al. | 119/28 X |

*Primary Examiner*—Hugh R. Chamblee
*Attorney, Agent, or Firm*—Bell, Seltzer, Park & Gibson

[57] ABSTRACT

Slotted floor sections formed of reinforced concrete and commonly referred to as gang slats, that underlie and serve to support farrowing crates within a farrowing house, are provided with conduit means embeddedly built in side sections of the gang slats for circulation of a heated fluid therethrough for promoting the health of the pigs by providing warmth thereto while avoiding applying heat to the sow.

6 Claims, 7 Drawing Figures

Fig-5

SLOTTED FLOOR SECTION WITH BUILT-IN MEANS ADAPTED FOR HEATING LITTER IN FARROWING HOUSE

FIELD OF THE INVENTION

The present invention relates to flooring for animal shelters such as farrowing houses or farrowing facilities, and more particularly concerns slotted floor sections with built-in means for heating only the litter of pigs. Specifically, the invention concerns slotted, reinforced concrete floor sections, which are commonly referred to as gang slats, that underlie and serve to support farrowing crates within a farrowing house. Each gang slat includes means for heating sections of the gang slat that are particularly accommodated for containment of the litter while avoiding applying heat to the sow.

BACKGROUND OF THE INVENTION

As the swine production industry has evolved from the status of a supplement to farm income to that of a mojor enterprise with production in intensified units, modern confinement facilities for the hogs and pigs have been developed. These facilities require the application of increasingly refined principles of breeding, nutrition, physiology, and environmental control so that the hogs can be developed to economically produce the maximum quality products. With respect to swine management, the primary object is to minimize environmental factors which are adverse to the swine so as to provide maximum opportunity for survival and growth.

Particularly during farrowing, a large number of pigs in the litter fail to survive for finishing or breeding as a result of crushing by the sow, infections, or starvation. Thus, climatically controlled farrowing houses or facilities with specially adapted farrowing pens have been employed to minimize the losses from the litter. Typically, the sow is confined within a central pen portion of the farrowing pen or crate, which is only large enough to permit her to recline on her side. Side pens of the farrowing crate adjacent each side of the central pen accommodate the litter, and a divider forming the adjacent sides of the central and side pens prevents the sow from entering the side pens and injuring the litter. The pigs in the litter, however, can obtain access to the sow for feeding by passing under the divider, and thereby, the pigs can move to either side of the sow as is required.

In the usual arrangement for an animal shelter of this farrowing house type, two rows of pens are provided along the length of the shelter, with the pens placed in a side-by-side arrangement adjacent each other. A center aisle between the rows provides access to the pens, and side aisles at the rear of the pens can also be included. The flooring of the shelter, which supports the pens and animals, is typically raised above the ground surface so as to form a pit beneath the flooring. Furthermore, the flooring is usually slotted to permit passage of the animals' waste through to the pit below. The slotted floors not only reduce or practically eliminate floor cleaning, but also greatly retard the spread of disease and parasites by allowing the rapid removal of excrement from the pens. Additionally, the slotted floor is an essential component in controlling the atmospheric environment of the farrowing house, in that air is circulated downwardly through the slots to control the temperature and diffusion of odors.

The survival and development of the litter and sow within a confinement facility of this type is dependent on proper control of ambient temperatures within the facility. A newborn pig is dependent on supplemental heat from the environment since it is incapable of maintaining its own body temperature. On the other hand, sows must be protected from exposure to high temperatures, since they have very limited ability to dissipate body heat by sweating. Typically, it is desirable to maintain a temperature of 80° F. for newborn pigs, while the surrounding temperature for the sow is preferably maintained at 65° F. Thus, any supplemental heat provided for the litter can adversely affect the sow if exposure to the heat occurs.

Prior methods of supplying supplemental heat for the litter have incorporated independent heating systems that direct radiant or convective heat toward the litter. Thus, in some facilities, heat lamps are positioned above the litter or pen in which the litter is contained. The inefficiency of radiant and convective heat supplied in this manner diminishes the economy of production. Furthermore, supplemental heat provided in this manner is not easily controlled to maintain the desirable temperature, and inadvertent heating of the sows cannot always be avoided.

Other methods of supplying supplemental heat to the litter have incorporated systems for heating the entire farrowing house. As shown in U.S. Pat. to Jones et al. No. 4,018,271, U.S. Pat. to Jones et al. No. 3,826,230, U.S. Pat. to Becker No. 3,815,550, and U.S. Pat. to Jones et al. No. 3,809,014, these heating systems adapt the flooring of the facility for circulation of a heated fluid through the flooring whereby heat is supplied by conduction and radiation. In a typical construction there is provided a slotted floor composed of individual slats positioned in a parallel spaced arrangement and supported at their opposite ends. The slats, which have been formed from precast concrete, aluminum, or thermoplastic materials, include conduits that are embedded within each individual slat for circulation of a heated fluid through the slat. The conduits are interconnected to form a continuous system, and thereby the complete surface of the flooring is heated as heat is conducted from the fluid. These systems do not allow selective heating of the litter alone, and detrimental heating of the sow cannot be avoided.

Furthermore, construction of the flooring for farrowing houses or facilities has been substantially simplified in recent years with the development of floor sections containing a plurality of slats and which are integrally formed by casting reinforced concrete. A representative product of this type is shown in Stevenson, U.S. Pat. No. 3,905,334. These integral floor sections are commonly referred to as gang slats. The gang slats are supported at opposite ends on the peripheral and center walls of the farrowing house in a manner similar to the installation of the individual slats, but there is an additional advantage in that installation is convenient. So far as can be determined, no one has heretofore provided any type of built-in heating means with gang slats and with which this invention is particularly concerned.

SUMMARY OF THE INVENTION

It is accordingly an object of the present invention to provide a slotted floor section for farrowing houses having built-in means adapted for heating the litter of newborn pigs so as to promote their growth and development.

Another object of the present invention is to provide a farrowing house or facility for sows and newborn pigs which includes a flooring system that is adapted to maintain sections of the flooring in a warm condition for heating the litter while avoiding applying heat to the sow. In this connection, it is also an object of this invention to provide an integral, reinforced concrete floor section for farrowing crates or pens which are contained within the farrowing house, the floor sections being adapted for circulation of a heated fluid within the portions of the floor section underlying the litter and not within the portions of the floor section underlying the sow.

It is a further object of the invention to provide an integral gang slat for underlying and supporting a farrowing crate or pen of the type which includes a pen for the sow and pens for the litter, and wherein the gang slat is adapted for circulation of a heated fluid under only the pens for the litter.

A further object of the present invention is to provide a flooring system for a farrowing house or facility that is adapted to maintain in a warm condition sections of the flooring underlying selected pens for confining the litter. Accordingly, it is an object of the invention to provide an alternative system for circulation of a heated fluid through two separate series of interconnected sections of gang slats underlying the pens containing the litter.

These and other objects and advantages of the present invention are achieved in the embodiments illustrated herein by the provision of an animal shelter for newborn pigs, wherein there is provided a plurality of farrowing crates arranged in opposing rows. Each farrowing crate includes a central pen for confining a sow and side pens extending along opposite sides of the central pen for confining a newborn litter of pigs in close proximity of the sow. A center aisle is disposed between the opposing rows of farrowing crates for access to the farrowing crates.

A plurality of slotted floor sections or gang slats are arranged in corresponding rows to underlie and support the farrowing crates. Each gang slat is formed from reinforced concrete and comprises a central section adapted to support the sow in the central pen and opposing side sections formed integrally with and extending along opposite sides of the central section and being adapted to support the litter in the side pens of one of the farrowing crates. The central section of each gang slat includes a plurality of slots through which the sow's waste can pass, and the side sections also include a plurality of slots through which the waste of the litter can pass.

Associated with each of the gang slats is means for circulation of a heated fluid through the gang slat to aid in maintaining surfaces of the side sections in a warm condition conductive to promoting a healthy litter of newborn pigs and while avoiding applying heat to the sow. The means for circulation comprises conduit means embedded within only the opposing side sections of the gang slats. Heat exchanger means connected to the conduit means supplies heated fluid for circulation through the conduit means, and means for transmitting heated fluid to the conduit means and for returning heated fluid to the heat exchanger means after dissipation of the heat from the fluid are also provided.

BRIEF DESCRIPTION OF THE DRAWINGS

Some of the objects and advantages of the invention having been stated, others will appear as the description proceeds, when taken in connection with the accompanying drawings, in which.

DESCRIPTION OF THE ILLUSTRATED EMBODIMENTS

Figures 2, 3:
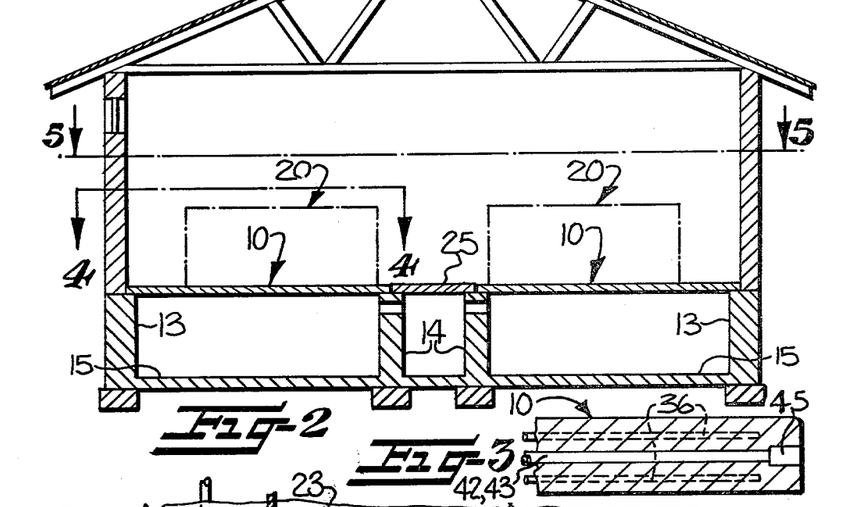
FIG. 2 is a sectional view of a farrowing house or facility containing the gang slat shown in FIG. 1.
FIG. 3 is a sectional view of the end of the gang slat shown in FIG. 1, and illustrating the conduit means.
Figure 5:
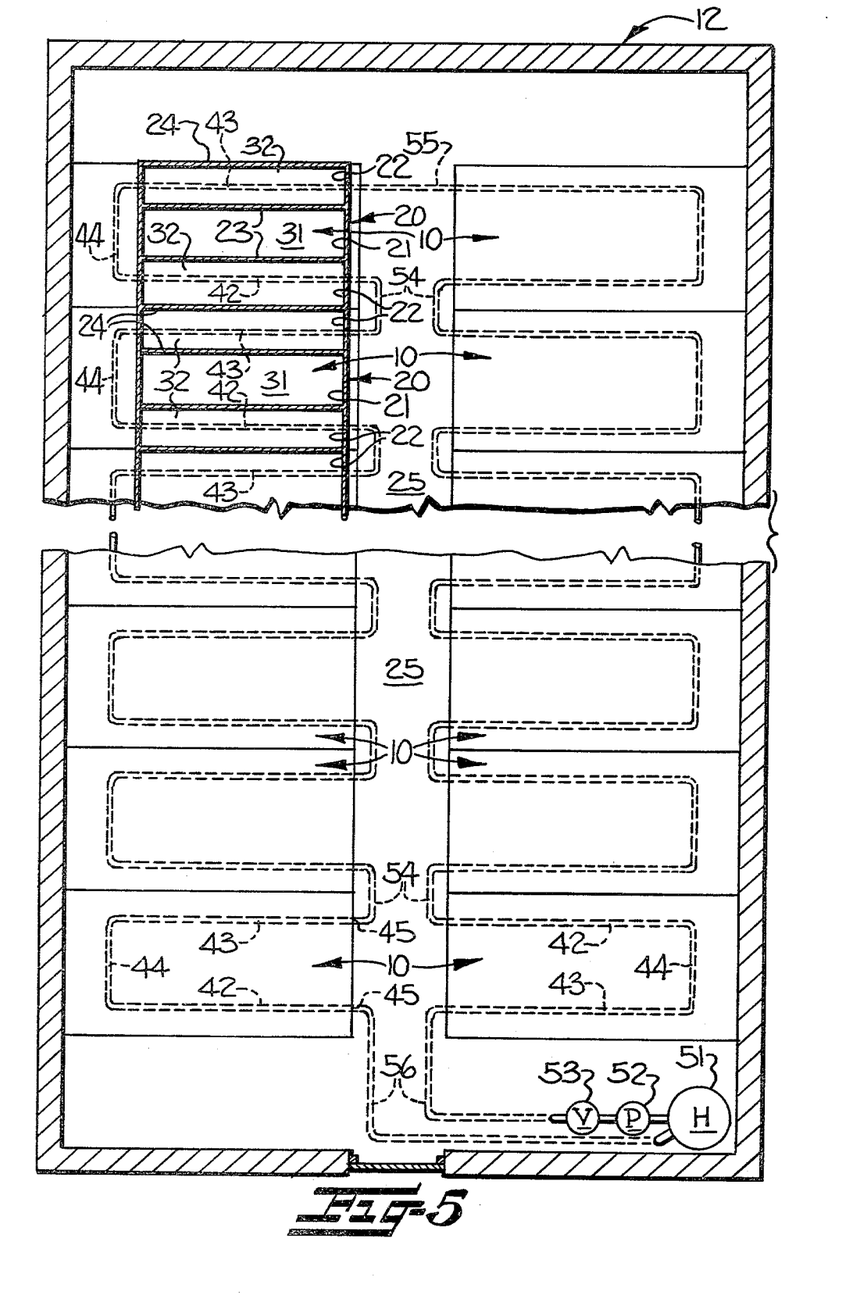
FIG. 5 is a sectional view of the farrowing house, taken substantially along the line 5—5 of FIG. 2, and illustrating the connection of the conduit means of the gang slats.

Referring more specifically to the drawings, the illustrated embodiment of the slotted floor sections, which are commonly referred to as gang slats, is indicated generally at 10, and as shown in FIGS. 2 and 5, the gang slats are adapted for installation in an animal shelter or farrowing house 12 for newborn pigs. The farrowing house 12 is provided with peripheral walls 13 and center walls 14 that extend longitudinally along the length of the farrowing house. The gang slats 10 are supported at their opposite ends by the associated peripheral wall 13 and center wall 14 and are positioned adjacent each other in opposing rows that extend along the length of the farrowing house 12. Thus, pits 15 are formed below the gang slats 10 and between the peripheral walls 13 and center walls 14 for purposes of collection of the pigs' waste as further described below.

The farrowing house 12 also includes a plurality of farrowing crates 20 for confinement of the sow and litter. Each farrowing crate 20 has a central pen 21 wherein the sow is confined, and side pens 22 extend along opposite sides of the central pen to contain the newborn litter of pigs in close proximity to the sow. A divider 23 separates the central pen 21 and the adjacent side pen 22 so that the sow cannot enter the area in which the litter is contained. However, it will be noted that the lower edge of the divider 23 is positioned above the lower edges of the remainder of the crate 20, and thereby the newborn pigs can obtain access to the sow. In addition, since the lower edge of the divider 23 is raised, the pigs in the litter can move from one side pen 22 to the other side pen on the opposite side of the central pen 21 and within the same farrowing crate 20. Thereby, the pigs in the litter have access to either side of the sow according to which side is exposed when the sow lies within the central pen 21.

The farrowing crates 20 are arranged in opposing rows along the length of the farrowing house 12, in a similar manner as the rows of gang slats 10. A fence section 24, perferably of solid construction, separates the crates from each other and serves to limit contact between the pigs to retard the spread of contagious diseases and to promote the health and development of the litter. A center aisle 25 is disposed between the opposing rows of farrowing crates 20 for ready access thereto.

Figure 1:
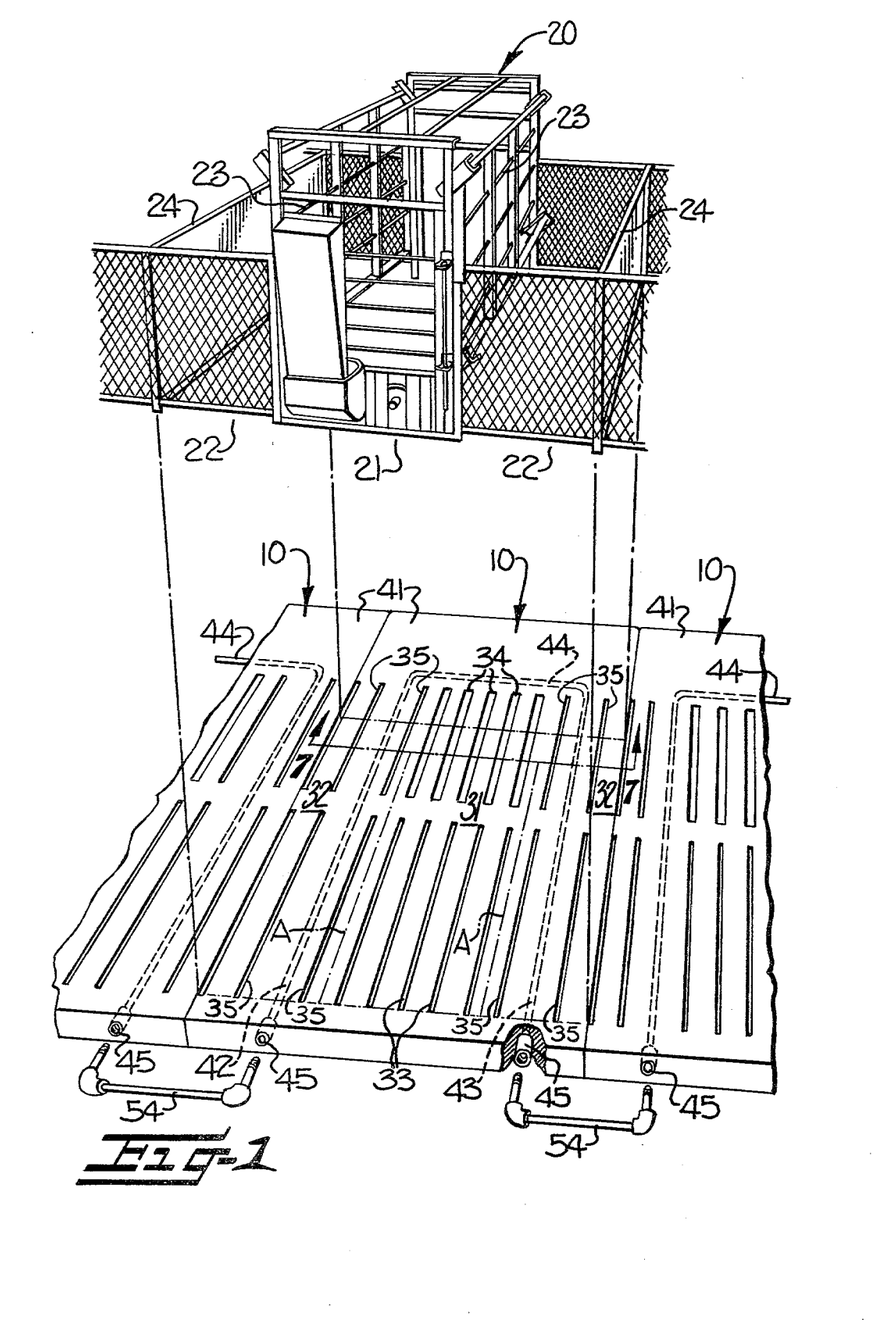
FIG. 1 is a perspective view of a floor section or gang slat embodying the features of the present invention, and illustrating the positional arrangement of a farrowing crate with respect to the gang slat.
Figure 4:
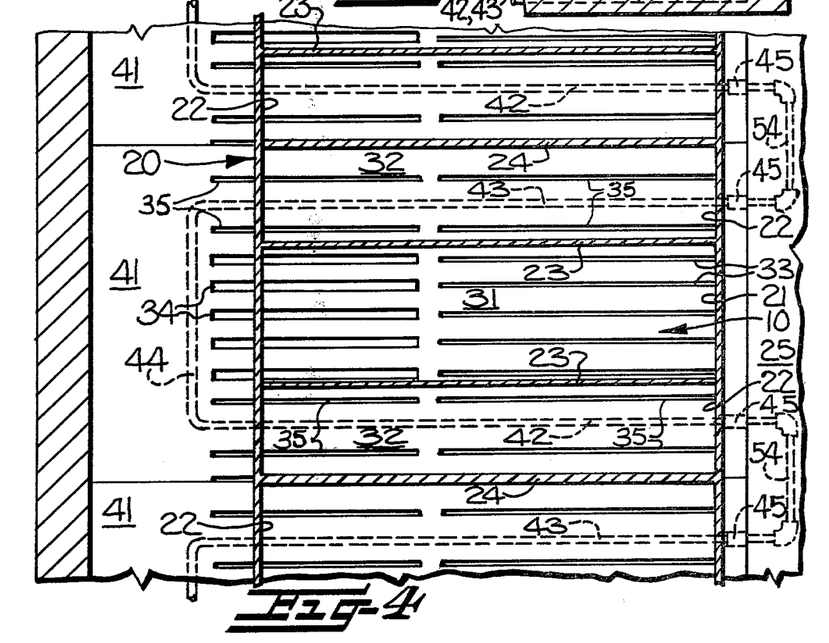
FIG. 4 is a sectional view of the farrowing crate and gang slat, taken substantially along the line 4—4 of FIG. 2, and illustrating the position of the farrowing crate relative to the gang slat.

As illustrated in FIGS. 1, 4 and 5, the farrowing crates 20 are positioned in opposing rows on the gang slats with a number of farrowing crates corresponding to the number of gang slats. Thus, each gang slat 10 supports a single farrowing crate, and comprises a central section 31 and opposing side sections 32 formed integrally therewith and extending along opposite sides of the central section. The central section 31 is adapted to support the sow in the central pen 21 of the associated farrowing crate. Similarly, the opposing side sections 32 are adapted to support the litter in the side pens 22 of the associated farrowing crate 20. Typically, the gang slat 10 has a overall size of five feet in width and about ten feet in length.

The overall size of the farrowing crate is substantially the same as a gang slat. Further, the central pen 21 of the farrowing crate overlies only the central section 31 of the gang slat, and the side pens 22 of the farrowing crate overlie only the side sections 32 of the gang slat. The divider 23 thereby not only separates the central and side pens 21 and 22, respectively, but also serves to define the central section 31 and side sections 32 of the gang slat 10. as represented by the broken lines A in FIG. 1.

For facilitating removal of the sow's waste, a plurality of longitudinally extending slots 33 and 34 are provided in respective front and rear portions of the central section 31 of the gang slat. In the illustrated gang slat 10, the front slots 33 of the central section 31 are positioned adjacent the center aisle in the farrowing house, and are typically ⅜ inches wide, with the slots 34 at the rear or other end of the central section typically being one inch wide. The sow is positioned within the central pen 21 so that the wider slots 34 are positioned underneath rear portions of her body for readily receiving the deposited waste therethrough into pit 15 therebelow. Thus, it can be appreciated that the slots 34 in the rear portion of the central section 31 provide for passage of the sow's waste therethrough, and the slots 33 in the front portion of the central section 31 provide for the passage therethrough of the waste from the litter of pigs moving about on the front portion of the central section. Also, as already noted, the slots 33 in the front portion of the central section 31 are of narrower width than the slots 34 in the rear portion of the central section and serve to lessen the likelihood of injury to the feet and legs of the newborn litter of pigs.

Figure 7:
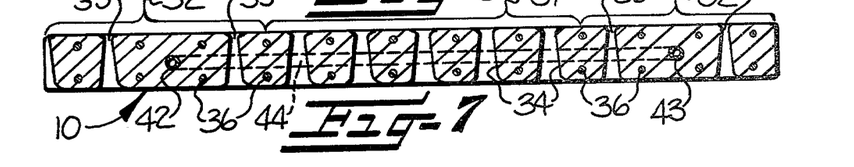
FIG. 7 is a sectional view of the gang slat shown in FIG. 1 and taken substantially along the line 7—7 of FIG. 1.

As indicated earlier, the gang slat 10 is integrally formed from reinforced concrete. Thus, central section 31 and side sections 32 of the gang slat are integrally formed with each other. To provide the desired structural strength to the gang slat 10, reinforcing rods 36 are arranged in upper and lower networks and embedded within the gang slat 10, as best shown in FIG. 7. Predominantly, the reinforcing rods 36 extend longitudinally of the gang slat and within the slat portions thereof between slots 33, 34 and 35. Reinforcing rods, not shown, are also conventionally positioned transversely within the ends of the gang slat and across the solid center section 37, all for the purpose of providing further strength to the gang slat.

The gang slat 10 further comprises an end section 41 which defines the rear end of the gang slat and is integrally formed with the central section 31 and side sections 32 and extends along one end of such sections and is adapted to be positioned entirely exterior to the farrowing crate 20. Thus, this end section 41 serves for defining a rear side aisle floor in the farrowing house for passage to and from the associated farrowing crate.

Associated with each of the gang slats 10 is means for circulation of a heated fluid therethrough, which aids in maintaining surfaces of the side sections 32 in a warm condition conducive to promoting a healthy litter of newborn pigs and while avoiding applying heat to the sow. In this manner, heat is radiated toward the litter or conducted to the litter when the pigs are in contact with surfaces of the side sections 32. The means for circulation of the heated fluid comprises conduit means embedded within only the opposing side sections 32 of the gang slats, and includes respective runs of conduit 42 and 43 extending longitudinally throughout the length of the side sections. Some of the slots 35 in the side sections are positioned between the longitudinally extending side runs of conduit 42 and 43 and the central section 31 of the gang slat 10 whereby conduction of heat from the runs of conduit to the central section is minimized. Furthermore, as best shown in FIG. 3, the upper and lower networks of reinforcing rods 36 are respectively positioned above and below the embedded runs of conduit 42 and 43 so as not to obstruct the runs of conduit while strengthening the gang slat 10. In this regard, it will be observed in FIGS. 1, 4 and 7 that adjacent slots 33 and adjacent slots 34 in the respective front and rear portions of the central section 31, and adjacent slots 35 in each side section 32, define respective substantially parallel, longitudinally extending concrete slat portions therebetween. Also, at least certain adjacent slots 35 in the side sections 32 are spaced further apart than adjacent slots in the central section 31 so that slat portions between the adjacent slots 35 of the side sections 32 are relatively wider than the slat portions of the central section 31 for accommodating the longitudinally extending side runs or side sections of conduit 42 and 43 embedded therein, and also providing relatively wide heated surfaces on the side sections 32 for attracting the litter of pigs thereonto conducive to promoting a healthy litter of pigs. It is also to be noted that, while the slots 35 in the side sections 32 provide for passage therethrough of the waste from the litter of pigs, the slots 35 are of relatively narrower width than the slots 34 in the rear portion of the central section 31 of the gang slat 10 so as to lessen the likelihood of injury to the feet and legs of the newborn litter of pigs.

Means interconnect corresponding ends of the runs of conduit 42 and 43 in the opposing side sections 32 so that heated fluid flows throughout one run of conduit, into and through the other run of conduit. For this purpose, the embodiment illustrated in FIGS. 1-5, includes transverse runs or sections of conduit 44 embedded within the end section 41 of the gang slat and interconnecting the runs of conduit 42 and 43 embedded within the opposing side sections 32 of the gang slat. Thus, heated fluid may flow from the run of conduit in one of the side sections 32 to the run of conduit in the other opposing side section without passing through the central section 31. In this manner, applying heat to the sow is avoided.

The other ends of the runs of conduit 42 and 43 in the opposing side sections 32 are defined by female connections 45 which are accessible at a common or same end of the gang slat for connection in a desired manner. Thus, as shown in FIGS. 1 and 3, the female connections 45 are shown with a larger diameter than the remainder of the runs of conduit 42 and 43. Conduit sections 54 are connected to the female connections 45 to interconnect the runs of conduit 42 and 43 in each gang slat to runs of conduit in other adjacent gang slats.

As best shown in FIG. 5, for connecting the conduits in the gang slats on one side of the aisle with the conduits in the gang slats on the other side of the aisle, a conduit section 55 is provided which spans across the far end of the center aisle 25. For connecting the conduits in the respective opposing rows of gang slats to fluid flow components, such as heat exchanger means 51, pump 52, and valve means 53, other conduit sections 56 are provided which, as illustrated in FIG. 5, are embedded within the center aisle and extend from and to the aforementioned associated fluid flow components.

Heat exchanger means 51, typically comprising a conventional hot water heater, is connected to the runs of conduit 42 and 43 and is adapted to supply heated fluid for circulation through the runs of conduit. There is also provided means for transmitting heated fluid to the runs of conduit 42 and 43 and for returning heated fluid to the heat exchanger means 51 after dissipation of heat from the fluid. The means for transmitting and returning heated fluid includes a conventional water pump 52 connected to the heat exchanger means 51. Valve means 53 is also included and connected to the heat exchanger means 51 and pump 52 for controlling the rate at which heated fluid is circulated through the runs of conduit 42 and 43, and thereby, the temperature to which surfaces of the side sections 32 are heated.

During construction of the farrowing house 12, the center aisle 25 is formed from poured concrete after the gang slats 10 are in place on the peripheral walls 13 and center walls 14 and after the runs of conduit 42 and 43 are connected. In this manner, the sections of conduit 54, 55 and 56 are embedded within the concrete forming the center aisle 25 and do not obstruct passage to and from the farrowing crates 20.

Figure 6:
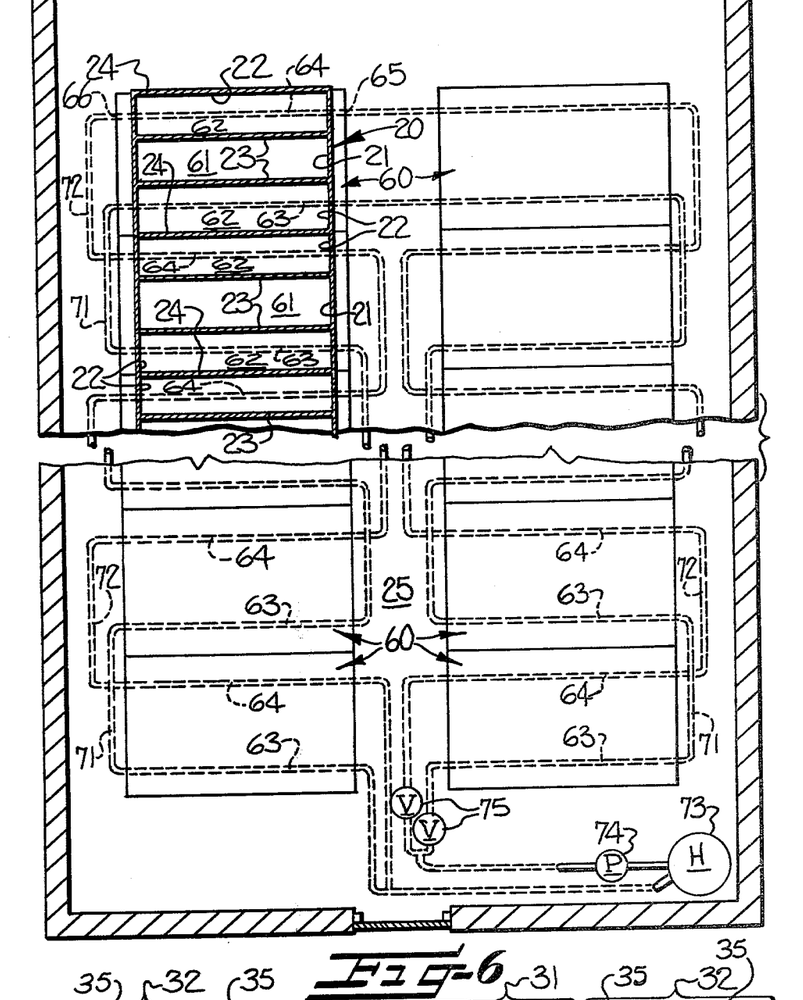
FIG. 6 is a sectional view of a farrowing house containing a second embodiment of the present invention, and illustrating the manner in which the conduit means are interconnected.

Another embodiment of the gang slat is illustrated schematically in FIG. 6 and is indicated generally at 60. This gang slat 60 basically differs over the gang slat 10 in that the same is of shorter length and does not have an end section defining said aisles of the farrowing house, as in the first embodiment. Instead, a farrowing house constructed with this gang slat 60, would typically have the side aisles formed of poured concrete in a similar manner of construction as the poured center aisle.

As in gang slat 10, gang slat 60 has conduit means embedded within the opposing side sections 62 and extending longitudinally throughout the length of the side sections which correspond to the overall length of the gang slat. As illustrated, the conduit means comprises respective runs of conduit 63 and 64 with female connections, not shown, defining opposite ends 65 and 66 of the runs. Such female connections would correspond with the female connections 45 as in the first form of the invention and are readily accessible at opposite ends of the gang slat 60 for connection is a desired manner.

While the runs of conduit 63 and 64 may be connected in a similar manner as in the first form of the invention for flow of heated fluid therethrough, alternatively as illustrated in FIG. 6, the corresponding runs in each gang slat are interconnected with each other in such a manner as to define first and second circulation systems for heated fluid to flow through the gang slats. Thus, as illustrated in FIG. 6, corresponding runs of conduit 63 in each gang slat are interconnected with each other by conduit sections 71 to define a first circulation system. The corresponding runs of conduit 64 in each gang slat are interconnected by conduit sections 72 for defining a second circulation system for the flow of heated fluid through the gang slats.

By the provision of the first and second circulation systems, the heating system can be operated to conserve hot water. Heat exchanger means 73 connected to the runs of conduit 63 and 64 is adapted to supply heated fluid for circulation through the runs of conduit of both circulation systems, and a pump 74 is also included for transmitting heated fluid to the runs of conduit and for returning heated fluid to the heat exchanger means 73 after dissipation of heat therefrom. There is also provided, however, valve means 75 associated with the first and second circulation systems for selective operation of one or both circulation systems. Thus, surfaces of corresponding side sections 62 on either side of the central sections 61 or surfaces of all side sections can be maintained in a warm condition. In this manner, the temperature required for development of the litter can be maintained.

In the drawings and specification, there have been set forth preferred embodiments of the invention and although specific terms are employed, they are used in a generic and descriptive sense only and not for purposes of limitation.

That which is claimed is:

1. In an animal shelter for newborn pigs, wherein there is provided a plurality of farrowing crates arranged in opposing rows, each farrowing crate having a central pen for confining a sow therein and side pens extending along opposite sides of the central pen for confining a newborn litter of pigs in close proximity to the sow, and wherein there is further provided a center aisle disposed between said opposing rows for access to said farrowing crates, the combination therewith of a plurality of slotted floor sections, commonly referred to as gang slats, arranged in corresponding rows to underlie and support said farrowing crates, each gang slat formed from reinforced concrete and comprising a central section adapted to support the sow in the central pen of one of said farrowing crates and having a plurality of slots in the rear portion thereof for passage of the sow's waste therethrough, said central section also having a plurality of slots in the front portion thereof for the passage therethrough of the waste from the litter of pigs moving about thereon, said slots in the front portion of said central section being of narrower width than the slots in the rear portion of the central section to lessen the likelihood of injury to the feet and legs of the newborn litter of pigs;

opposing side sections formed integrally with said central section and extending along opposite sides of said central section, said side sections being adapted to support the litter in the side pens of said one farrowing crate and having a plurality of slots therein for passage therethrough of the waste from the litter of newborn pigs, said slots in said side sections also being of narrower width than the slots in the rear portion of said central section to further lessen the likelihood of injury to the feet and legs of the newborn litter of pigs;

adjacent slots in each of said central and side sections defining respective substantially parallel, longitudinally extending concrete slat portions therebetween with at least certain adjacent slots in said side sections being spaced further apart than adjacent slots in each respective central section so that the slat portions defined between said certain adjacent slots of the side sections are relatively wider than the slat portions of each central section;

an end section also formed from reinforced concrete and integrally with said central and side sections of each respective gang slat, each end section being positioned adjacent said central and side sections and defining the rear end of the respective gang slat and adapted to be positioned entirely exteriorly of the associated farrowing crate for serving as a rear side aisle floor; and means associated with each of said gang slats for circulation of a heated fluid therethrough so as to aid in maintaining surfaces of said opposing side sections and said rear end section in a warm condition conducive to promoting a healthy litter of newborn pigs and while avoiding applying heat to the sow, said means comprising conduit means embedded within only said opposing side sections and said rear end sections of said gang slats;

heat exchanger means for supplying heated fluid for circulation through said conduit means; and means interposed between said heat exchanger means and said conduit means for circulating heated fluid to said conduit means and for returning heated fluid to said heat exchanger means after dissipation of heat therefrom; and said conduit means including longitudinally extending side runs of conduit embedded in and extending longitudinally of only said relatively wider slat portions of said side sections and a transverse run of conduit embedded in said rear end section of each gang slat and interconnecting the respective longitudinally extending side runs of conduit thereof so that said relatively wider slat portions of said side sections of each gang slat will be heated for attracting the respective litter of pigs thereonto conducive to promoting a healthy litter of pigs, and there being at least one of the slots of each side section located between each respective side run of conduit and the respective central section to minimize conduction of heat from the side runs of conduit to the central section of each gang slat for thus avoiding applying heat to the sow.

2. In the combination as defined in claim 1 wherein said conduit means embedded within said opposing side sections of each gang slat includes female connections accessibly positioned along a common end of the gang slats and defining conduit entrance and exit ends embedded within said side sections for facilitating interconnection of said conduit means.

3. In the combination defined in claim 1 wherein each gang slat includes upper and lower networks of reinforcing rods embedded within said gang slat and being respectively positioned above and below said embedded conduit means so that said gang slats are strengthened by said networks so as to support substantial weight from the farrowing crate, the sow, and the litter.

4. An integral slotted floor section, commonly referred to as a gang slat, adapted to underlie and serve as the floor for supporting a farrowing crate having a central pen for confining a sow therein and side pens extending along opposite sides of the central pen for confining a newborn litter of pigs in close proximity to the sow, and comprising a central section formed from reinforced concrete and adapted to support the sow in the central pen, said central section having a plurality of slots in the rear portion thereof for passage of the sow's waste therethrough, said central section also having a plurality of slots in the front portion thereof for the passage therethrough of the waste from the litter of pigs moving about thereon, said slots in the front portion of said central section being of narrower width than the slots in the rear portion of the central section to lessen the likelihood of injury to the feet and legs of the newborn litter of pigs;

opposing side sections also formed from reinforced concrete and integrally with said central section, said side sections extending along opposite sides of said central section and being adapted to support the litter in the side pens, said side sections also having a plurality of slots therein for passage therethrough of the waste from the litter of pigs, said slots in said side sections also being of narrower width than the slots in the rear portion of said central section to further lessen the likelihood of injury to the feet and legs of the newborn litter of pigs;

adjacent slots in each of said central and side sections defining respective substantially parallel, longitudinally extending concrete slat portions therebetween with at least certain adjacent slots in said side sections being spaced further apart than adjacent slots in said central section so that the slat portions defined between said certain adjacent slots of the side sections are relatively wider than the slat portions of said central section;

an end section also formed from reinforced concrete and integrally with said central and side sections, said end section being positioned adjacent said central and side sections and defining the rear end of said gang slat adapted to be positioned entirely exterior to the associated farrowing crate for serving as a rear side aisle floor; and conduit means embedded within only said side sections and said rear end section of the gang slat for circulation of a heated fluid therethrough so as to aid in maintaining surfaces of said side sections in a warm condition while thus avoiding applying heat to the sow, said conduit means including longitudinally extending side runs to conduit embedded in and extending longitudinally of only said relatively wider slat portions of said side sections and a transverse run of conduit embedded in said rear end section of the gang slat and interconnecting said longitudinally extending side runs of conduit so that said relatively wider slat portions of said side sections may be heated for attracting the litter of pigs thereonto conducive to promoting a healthy litter of pigs, and there being at least one of the slots of each side section located between each respective side run of conduit and said central section to minimize conduction of heat from the side runs of conduit to the central section of the gang slat.

5. The gang slat as defined in claim 4 wherein said conduit means embedded within said opposing side sections comprises female connections accessibly positioned along the same end of the gang slat and defining conduit entrance and exit ends embedded within said side sections for facilitating connection in the desired manner.

6. The gang slat as defined in claim 4 further comprising upper and lower networks of reinforcing rods embedded within the gang slat and being respectively positioned above and below said embedded conduit means so that the gang slats are strengthened by said networks so as to support substantial weight from the farrowing crate, the sow, and the litter.

* * * * *

UNITED STATES PATENT AND TRADEMARK OFFICE
CERTIFICATE OF CORRECTION

PATENT NO. : 4,217,859
DATED : August 19, 1980
INVENTOR(S) : William Thomas Herring It is certified that error appears in the above-identified patent and that said Letters Patent are hereby corrected as shown below:

Column 1, Line 23, "mojor" should be --major--

Column 3, Line 40, "of" should be --to--; same
Column 3, line 59, "conductive" should be -- conducive --.

Column 10, Line 64, CLAIM 4, "to" should be --of--

Signed and Sealed this

Twenty-fifth Day of November 1980

[SEAL]

Attest:

SIDNEY A. DIAMOND

Attesting Officer

Commissioner of Patents and Trademarks